US008429647B2

(12) United States Patent
Zhou et al.

(10) Patent No.: US 8,429,647 B2
(45) Date of Patent: Apr. 23, 2013

(54) VIRTUAL MACHINE MIGRATION ACROSS NETWORK BY PUBLISHING ROUTES TO THE ASSOCIATED VIRTUAL NETWORKS VIA VIRTUAL ROUTER AFTER THE START OF MIGRATION OF THE VIRTUAL MACHINE

(75) Inventors: Shudong Zhou, Fremont, CA (US); Andrew Lambeth, San Mateo, CA (US); Mark Pariente, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 476 days.

(21) Appl. No.: 12/436,735

(22) Filed: May 6, 2009

(65) Prior Publication Data

US 2010/0287548 A1 Nov. 11, 2010

(51) Int. Cl.
  *G06F 9/45* (2006.01)
  *G06F 15/173* (2006.01)
(52) U.S. Cl.
  USPC ............... 718/1; 709/220; 709/226; 709/245
(58) Field of Classification Search ...... 718/1; 711/162, 711/165; 709/226, 245, 220
  See application file for complete search history.

(56) References Cited

U.S. PATENT DOCUMENTS

| 6,970,902 | B1 * | 11/2005 | Moon .......................... 709/201 |
| 7,484,208 | B1 | 1/2009 | Nelson |
| 7,802,000 | B1 * | 9/2010 | Huang et al. .................. 709/228 |
| 8,095,929 | B1 * | 1/2012 | Ji et al. ............................. 718/1 |
| 2007/0180436 | A1 * | 8/2007 | Travostino et al. ........... 717/138 |
| 2007/0280243 | A1 * | 12/2007 | Wray et al. .................... 370/392 |
| 2009/0034416 | A1 * | 2/2009 | Baron et al. ................... 370/235 |
| 2009/0119087 | A1 * | 5/2009 | Ang et al. ......................... 703/23 |
| 2009/0327392 | A1 * | 12/2009 | Tripathi et al. ............... 709/201 |
| 2010/0107162 | A1 * | 4/2010 | Edwards et al. .................. 718/1 |

OTHER PUBLICATIONS

Bradford et al., Live Wide-Area Migration of Virtual Machines Including Local Persistent State, Jun. 13-15, 2007, ACM, pp. 169-179.*
Clark et al., Live Migration of Virtual Machines, 2005, USENIX, pp. 273-286.*

(Continued)

*Primary Examiner* — Meng An
*Assistant Examiner* — Abu Z Ghaffari (57) ABSTRACT

Methods, systems and computer programs for migrating a virtual machine (VM) executing on a first host to a second host are presented, where the first host and the second are on different networks. One embodiment of a method includes assigning to the VM a VM address (VMA) belonging to a VM network and publishing a first route to an associated network (AN) via a first virtual router executing on the first host. The method further includes migrating the VM from the first host to the second host, the VM maintaining the assigned VMA after migrating, and publishing a second route to the AN via a second virtual router executing on the second host. The first and second virtual routers have addresses belonging to the VM network, and network packets to and from the VM flow through the virtual router where the VM is executing. A temporary tunnel between the virtual routers allows traffic to flow to the VM while the new route to AN is propagated throughout the network. The use of the associated network, which is associated with the VM, and the publishing of a new route to the VM allow the VM to keep the original VMA network address after the migration.

19 Claims, 10 Drawing Sheets

OTHER PUBLICATIONS

K. K. Ramakrishnan et al., "Live Data Center Migration across WANs: A Robust Cooperative Context Aware Approach", INM '07, ACM 978-1-59593-788-9/07/0008, Aug. 27-31, 2007, Kyoto, Japan, 6 pages.

Franco Travostino et al., "Seamless Live Migration of Virtual Machines over the MAN/WAN", Elsevier Future Generation Computer Systems 2006, 10 pages.

Marvin M. Theimer et al., "Preemptable Remote Execution Facilities for the V-System", Computer Science Department Stanford University, Stanford, CA, 1985, ACM-0-89791-174-1-12/85-0002, 11 pages.

Michael Nelson et al., "Fast Transparent Migration for Virtual Machines", Proceedings of USENIX '05: General Track, Anaheim, CA, Apr. 10-15, 2005, 2005 USENIX Annual Technical Conference, 5 pages.

* cited by examiner

VIRTUAL MACHINE MIGRATION ACROSS NETWORK BY PUBLISHING ROUTES TO THE ASSOCIATED VIRTUAL NETWORKS VIA VIRTUAL ROUTER AFTER THE START OF MIGRATION OF THE VIRTUAL MACHINE

TECHNICAL FIELD

One or more embodiments relate to migrating process execution environments from one host to another host, and more particularly, to migrating virtual machines across different networks.

BACKGROUND

Virtualization of computer resources generally involves abstracting computer hardware, which essentially isolates operating systems and applications from underlying hardware. Hardware is therefore shared among multiple operating systems and applications wherein each operating system and its corresponding applications are isolated in corresponding virtual machines (VM) and wherein each VM is a complete execution environment. As a result, hardware can be more efficiently utilized.

A VM executing on a virtualized computer system will typically be limited to hardware resources (such as memory space, CPU cycles, network bandwidth, and so on) provided by that virtualized computer system, i.e., VMs executing on a first virtualized computer system typically share the hardware resources of the first virtualized computer system, and VMs executing on a second virtualized computer system typically share the hardware resources of the second virtualized computer system. As such, the performance of a VM will depend on the hardware resources of the virtualized computer system on which the VM is executing, as well as demands of any other VMs executing on the same virtualized computer system.

One aspect of virtualization is an ability to live migrate workload transparently from one host computer of a virtualized computer system to another, where live migration is sometimes referred to as VMotion. With VMotion, workloads can be dynamically balanced among host computers. In addition, VMotion enables hardware maintenance to be performed without service interruption by migrating a workload off a host computer that needs to be shut down.

Existing VMotion solutions work well in a data center environment where all virtualization software runs on top of a single physical network. However, this imposes a limitation for users that need to perform VMotion across networks, such as migrating VMs to a remote network at a different site to enable sharing of resources across diverse geographical locations or implementing seamless disaster avoidance solutions.

SUMMARY

The Embodiments presented provide methods, systems and computer programs for migrating a virtual machine (VM) executing on a first host to a second host, where the first host and the second are on different networks. In particular, a method includes assigning to the VM a VM address (VMA) belonging to a VM network and publishing a first route to an associated network (AN) via a first virtual router executing on the first host. The method further includes migrating the VM from the first host to the second host, the VM maintaining the assigned VMA after migrating, and publishing a second route to the AN via a second virtual router executing on the second host. The first and second virtual routers have addresses belonging to the VM network, and network packets to and from the VM flow through the virtual router where the VM is executing.

A temporary tunnel between the virtual routers allows traffic to flow to the VM while the new route to AN is propagated throughout the network. The use of the associated network, which is linked to the VM, and the publishing of a new route to the VM allow the VM to keep the original VMA network address after the migration. In one embodiment, a computer program embedded in a computer-readable storage medium, when executed by one or more processors, performs the method operations.

In another embodiment, a system is presented for migrating a VM from a first computer on a first network to a second computer on a second network different from the first network. The system includes a first virtual router executing in the first computer, and a second virtual router created in the second computer after determining that the VM is moving to the second computer. The first and second virtual routers publish an address of an associated network (AN). The AN is linked to the VM to enable the VM to preserve the same network address while executing on the first and on the second computer. Further, network packets, to and from the VM, flow through the virtual router where the VM is executing.

DETAILED DESCRIPTION

One or more embodiments include a method, an apparatus, and a computer program for migrating a virtual machine (VM) executing on a first host (for example, a host computer) on a first network to a second host on a second network different from the first network. It will be clear, however, to one skilled in the art, that one or more embodiments may be practiced without some or all of these specific details. Further, in some instances, well known process operations have not been described in detail in order not to obscure an understanding of the embodiments. Although one or more such embodiments of the invention relate to migrating a VM, further embodiments relate to migrating an execution environment containing a network end point to a different system.

Figure 1:
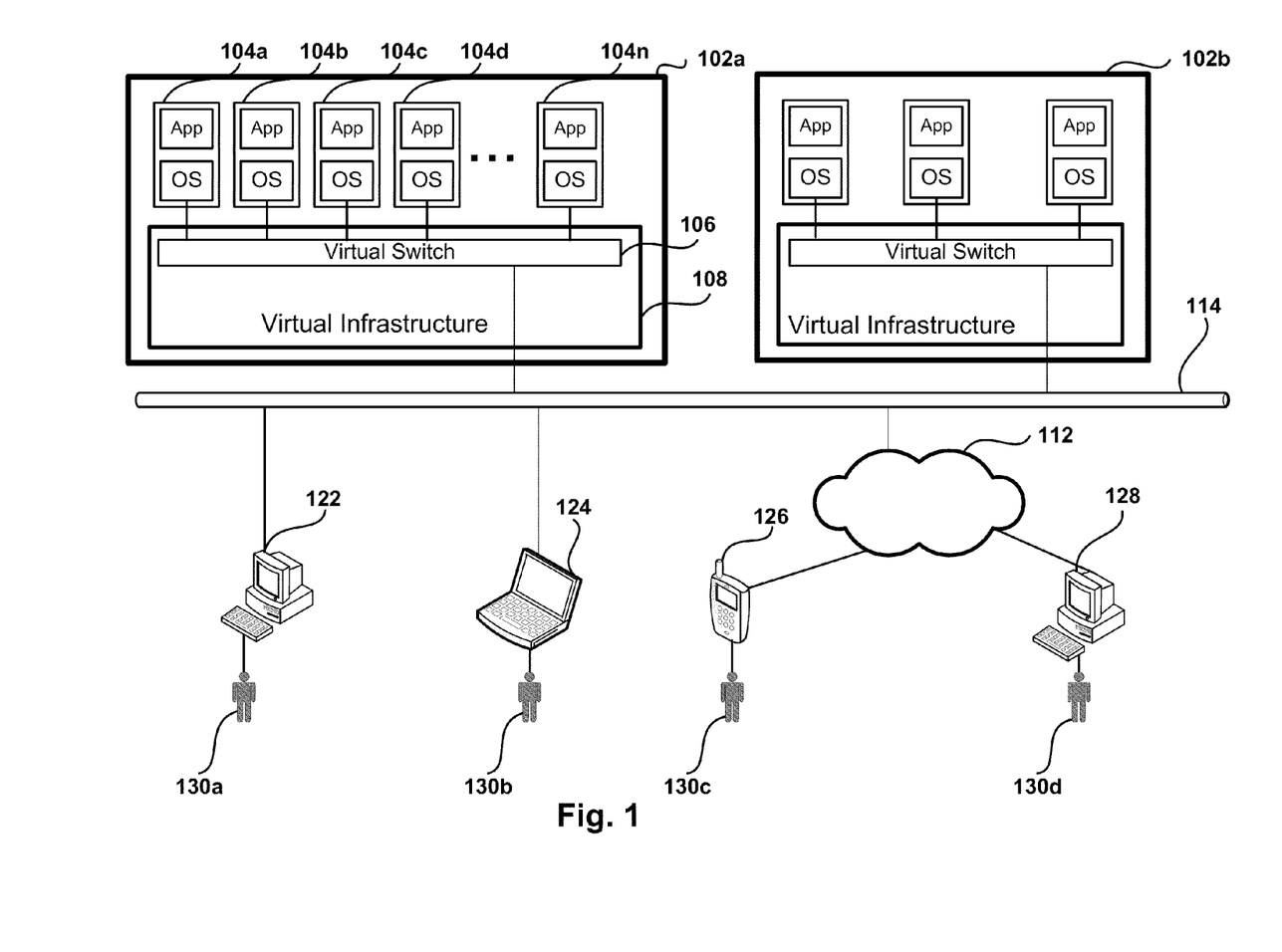
FIG. 1 depicts a remote desktop environment including virtual machine servers, according to one embodiment.

FIG. 1 depicts a remote desktop environment including VM servers, according to one embodiment. The environment depicted in FIG. 1 includes enterprise servers 102a-b, also referred to herein as hosts, that provide virtual desktop services to remote users 130a-d. Although embodiments are described within a virtual desktop system and VMs, the embodiments presented can be used in environments where several servers are used to support processes which can be hosted by any of the servers. Some embodiments below are described with respect to VMs, but the same principles apply to processes running on a multi-host environment.

The architecture of a virtualized computer system is shown in FIG. 1 with some components omitted for simplification purposes. The virtualized computer system includes VMs 104a-n, and virtual infrastructure 108. Among other things, virtual infrastructure 108 manages the assignment of VMs 104a-n to remote users. As shown in FIG. 1, each VM includes a Guest Operating System (GOS) supporting applications running on the GOS. Virtual infrastructure layer 108 also includes Virtual Switch 106 that provides network connectivity services to VMs 104a-n.

As further shown in FIG. 1, remote users 130a-d utilize devices 122, 124, 126 and 128 which act as clients in the remote desktop environment. Devices 122, 124, 126 and 128 provide display presentation and input/output capabilities associated with VMs 104a-n. The devices include PCs 122 and 128, laptop 124, and a PDA (mobile phone 126). As further shown in FIG. 1, the devices can communicate with the hosts over the same private network 114 as the hosts, or they can communicate with the hosts remotely via network 112.

Figure 2A:
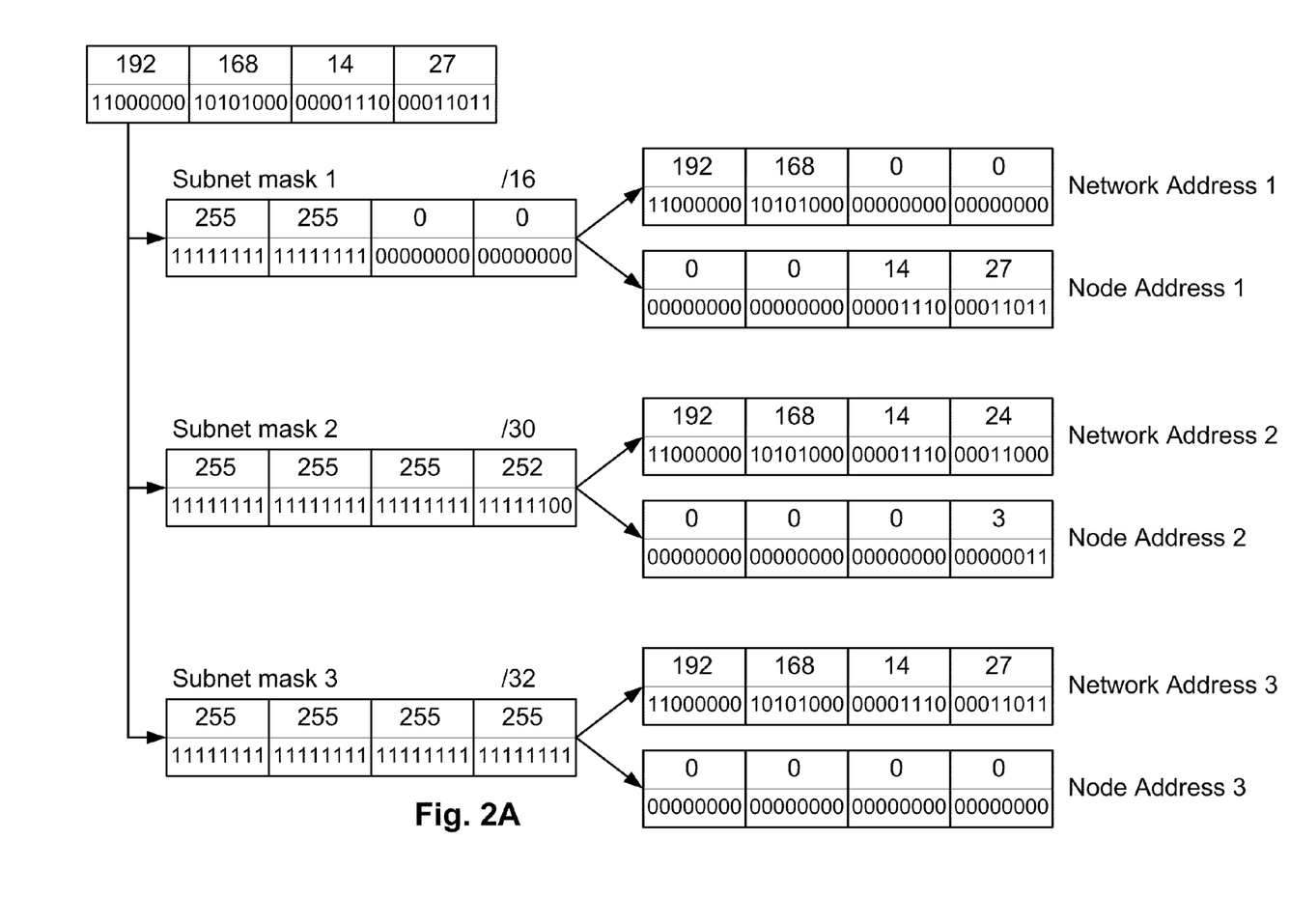
FIG. 2A includes a graphical illustration of a process for applying different subnet masks to an IP address.

FIG. 2A includes a graphical illustration of a process for applying different subnet masks to an IP address. As is known, nodes in an IP network are assigned IP addresses. In IP version 4, network addresses have 32 bits which include a network part and a node part. The network part is used to allow packets to be sent to other networks and the node part is used to differentiate nodes within a network. All the nodes in the same network have the same network address.

In the 1981 original IP specification (RFC 791), there were three classes of networks, with network address occupying one, two, or three bytes. This address scheme was changed in 1985 to allow better utilization of the address space by introducing subnets in RFC 950. A subnet mask, also referred to as an address mask or a bitmask, identifies which bits of a local address field indicate a subnet number. The subnet mask is a 32 bit number. Given an IP address, the network address, also referred to as the subnet address, is obtained by applying a logical AND to each of the bits in the IP address with the corresponding bit in the subnet mask. The node address is obtained by applying a logical AND to each of the bits in the IP address with the logical NOT of the corresponding bit in the subnet mask.

Three examples are given in FIG. 2A for applying subnet masks to IP address 192.168.14.27. The binary representation of the IP addresses is shown below each address. In the first example a subnet mask of 255.255.0.0, also referred to as /16 for using 16 bits for the network address, is applied to the IP address. Since 16 bits are used, the network address includes the first 16 bits, and the node address includes the last 16 bits.

In the second example, a mask of /30 is used resulting in a node address that includes the last two bits. The third example includes a subnet mask of /32, which seems unorthodox because the result is that the network address is the complete IP address (i.e., no node address is available to differentiate the nodes in this network). This scheme, including a mask of /32, is used by embodiments of the invention as described below. This is possible, because the network address with /32 is only used for routing packets to a desired router, which router then exchanges an address from the network with /32 mask to a different IP address.

It should be noted that examples of embodiments of the invention are described below using IP addresses, but the same principles apply to any network protocol that uses packet routing.

Figure 2B:
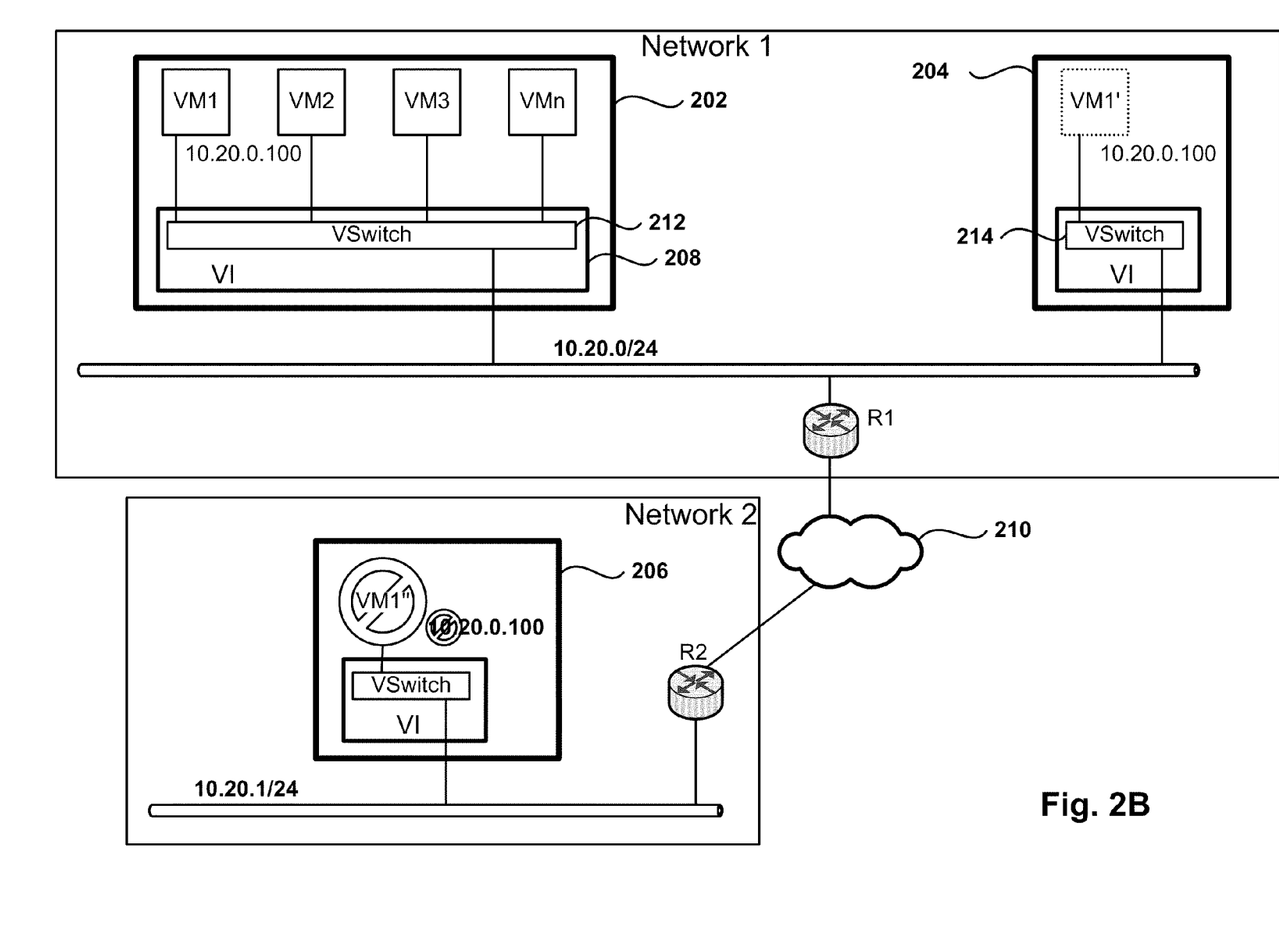
FIG. 2B illustrates a method of migrating a process from one host to another host, according to one embodiment.

FIG. 2B illustrates a method of migrating a VM from one host to another host, according to one embodiment. When migrating a VM, it is required that all network services remain available as the VM workload migrates from a source host to a destination host. When both source and destination hosts are connected to the same physical network in a data center, VM migration remains transparent to the external network as long as the time spent switching service from source to destination is sufficiently small. When migrating a VM to a host on a different network, also referred to herein as long distance migration or inter-network migration, the workload is migrated from one physical network to another. In order to resume service at the destination network without having to reconfigure client software, extra operations are required to solve the problem associated with having the VM reside on a different network. The problem is that the VM cannot use the same IP address it originally used in the source host because the destination host resides on a different network. In order for the VM to communicate in the destination network, the VM must have an IP address from the destination network, but the IP address from the source network will not allow the VM to use network services at the destination.

In the example shown in FIG. 2B, a virtual machine VM1 is migrating from host 202 to either host 204 or host 206. VM1 inside host 202 uses Virtual Infrastructure (VI) 208 which provides hosting services to VM1. VI 208 includes a virtual switch VSwitch 212 which is used to provide network connectivity for VM1 by delivering packets for the VM's virtual MAC address to the VM.

If VM1 migrates to host 204, a copy VM1' of VM1 is made in host 204. The original VM1 is shut down, and VM1' starts running VSwitch 214 at host 204 notifies the physical network of the presence of VM's MAC address on host 204. Traffic to VM1 will reach VM1' because packets in network 10.20.0/24 will deliver packets destined to VM1 to the VSwitch in host 204, which will deliver the packets to VM1'. Hosts outside network 1 will also find VM1' because the routing of packets has not changed. Router R1 will deliver incoming network packets destined for a node in network 10.20.0/24 according to the node's virtual MAC address. For example, a packet from network 10.20.1/24 arriving at R1 destined for VM1 will cause R1 to look at R1's MAC address table and deliver to the MAC address corresponding to 10.20.0.100 through the network switch, which will transfer the packet to VSwitch 214 after the VM has migrated.

In the case where VM1 migrates to host 206, the previously described method would not work. If VM1" (a copy of VM1) were activated with the same IP address as VM1, VM1" would lose network connectivity, because VM1" is in network 2 with address 10.20.1/24. The original VM1 IP address of 10.20.0.100 does not work inside network 10.20.1/24, because the address would not conform to the requirements of the IP protocol where all the hosts in a network (or subnet) must have the same network (or subnet) address.

One solution to this problem is to connect multiple physical networks together over long distances and make them behave as a single network. Technologies such as stretched VLAN (virtual LAN) and Ethernet over Multi Protocol Label Switching (MPLS) have been shown to work over long distances. However, there are problems with these solutions. Since multiple physical networks behave as a single one, isolation between data centers at different locations is lost. A problem in one data center may take down all data center networks in the stretched virtual LAN. For example, a broadcast storm in one site may bring down all the networks in the stretched virtual environment.

Another solution exploits the characteristics of the internet Domain Name Service (DNS). Most applications contact network services via a name, such as google.com. The DNS translates this name to an IP network address. During long distance migration, the VM acquires a new IP address native to the new physical network, and the DNS is updated to map the service name to the new IP address. However, this solution only works for applications that use a service name instead of an IP address. Another limitation when using connection oriented services, such as TCP, is that existing connections to and from VM1 would be broken due to the change in the IP address. The client would be required to reestablish the connections using the service name.

In yet another solution, sometimes referred to as IP triangulation, an agent is left in the source network that forwards network traffic to the destination network. This technique is commonly used in wireless networks to track mobile phones. This method provides transparency to the service client, but the method requires that the source physical network remain available. Such an approach does not work for disaster avoidance, since any failure in the source network, such as a power outage or a hurricane, would terminate the network connectivity for the VM even though the VM may be residing in a fully operational network.

Embodiments of the invention dynamically change the binding of the VM IP address to a physical network by exploiting internet routing protocols.

Figure 3:
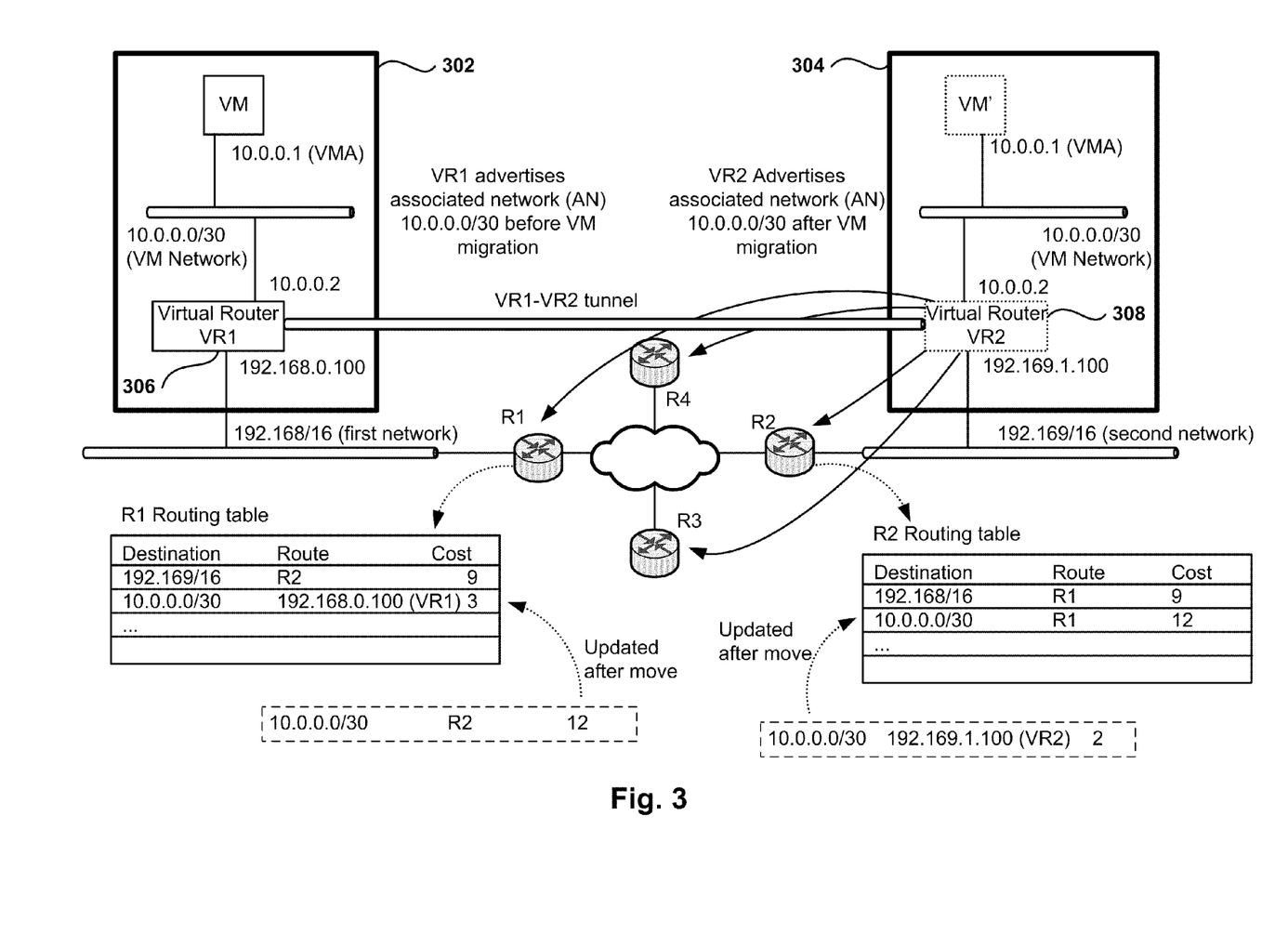
FIG. 3 includes a network diagram for migrating a VM to a different host on a different network, in accordance with one embodiment of the invention.

FIG. 3 includes a network diagram for migrating a VM to a different host on a different network, in accordance with one embodiment of the invention. The configuration shown in FIG. 3 adds virtual router 1 (VR1) 306 in the source host between the VM and the network. Although it is called virtual, the router is real in the sense that VR1 306 performs the functions of a router, such as routing packets from one network to another. The name virtual refers to the fact that it is not a stand-alone router sitting on the network, but rather a module or a software component embedded in a layer of the virtualization software inside the host. The virtual router forwards packets from the VM to the appropriate network and vice versa.

The network configuration for the VM places the VM in its own small IP subnet 10.0.0.0/30, herein referred to as a VM network. The virtual MAC address of the VM is configured to correspond with IP address 10.0.0.1 and net mask of 255.255.255.252 (or /30). The VM always routes traffic to 10.0.0.2, the network address of VR1 306. VR1 advertises or publishes the presence of the subnet 10.0.0.0/30 to the outside world. Subnet 10.0.0.0/30 is herein referred to as the associated network because it is linked or associated with the VM. The network is associated with the VM because no other VM or node in the network, besides VR1, are tied to this network. In the embodiment of FIG. 3, the VM network and the associated network are one and the same. However, in the embodiment referenced in FIG. 4 below, the associated network and the VM network are different, where the associated network is linked to the VM but the VM is never aware of the existence of this associated network, and only VR1 is aware. VR1 performs the required operations to hide the use of the associated network to the VM.

Another interface in VR1 has an address of 192.168.0.100 belonging to subnet 192.168/16 (first network) where original host 302 sits. A live VM migration, also referred to herein as VMotion, is initiated by a hand shake between management software at the source and destination hosts. The destination host 304 prepares for the new VM (i.e., VM') by allocating a local IP address (192.169.1.100 in subnet 192.169/16 (second network]) for a new virtual router 2 (VR2) 308 in destination host 304. VM storage arrangements are assumed to be made, by remote access, by replication, or by some other mechanism.

As the migration starts, the VM's memory is copied from source host 302 to destination host 304 while the source VM is running. At some point, the source VM is stunned and control is transferred from the source to the destination. At this point, VR1 306 at the source host stops advertising the VM subnet 10.0.0.0/30 and VR2 308 starts advertising the same VM subnet at the destination. This triggers a series updates in the physical network. Once the routing update propagates to all relevant routers, service will resume at the destination network.

As shown in FIG. 3, router R1 is connected to the original subnet, and before the migration, has a routing table that includes the entries (192.169/16, R2, 9) and (10.0.0.0/30, 192.168.0.100 (VR1), 3), where the values in each trio are the destination, the route, and the cost. The cost gives an indication of the quality or expense associated with the route in a given entry and is used to select the best route to the destination, such that when two different routes are possible to a destination network, the route with the lower cost will be selected. Oftentimes the cost reflects the number of hops to the destination network, but other heuristics methods are also possible. After the VM migrates, the value for 10.0.0.0/30 is updated in R1's routing table as (10.0.0.0/30, R2, 12) to reflect that the route to the network associated with the VM is now through router R2. Similarly, an entry in the routing table of R2 is made to change from (10.0.0.0/30, R1, 12) to (10.0.0.0/30, 192.169.1.100 (VR2), 2). It should be noted that, in one embodiment, the updates to the router for the cost of the route to 10.0.0.0/30 is made purposefully lower so routers that still have the old route through R1 use the new route instead. In another embodiment, the cost for the new route is not made purposefully lower to increase the priority of the new route, instead relying on the obsolescence of the old route in the routers.

As a result, migrating the VM causes a move of the address of the network associated with the VM (10.0.0.0/30), resulting in updates to the routing tables. The VM can be found in the new location after the move.

Depending on the physical network architecture, it can take minutes for a routing update to propagate to all routers (i.e. achieve routing convergence). During routing updates, packets intended for the migrating VM would be dropped because the packets would arrive at the original location but the VM is no longer there. If the router update time is longer than the TCP connection timeout, existing connections would be dropped, resulting in service interruptions. This problem is mitigated by updating the physical network to reduce routing convergence time. In fact, many enterprises have achieved routing convergence times of 30 second or less. Nevertheless, upgrading the physical network takes time and resources.

In one embodiment, the source virtual router VR1 continues to advertise the VM subnet, possibly at a higher cost than previously, for a short period of time after control is handled over to the destination VM'. During this time, a tunnel VR1-VR2 is established between source and destination virtual routers.

The source router VR1 forwards all traffic to the destination router VR2 through the tunnel. As it is well known in the art, a tunnel represents an abstraction for a communication method between two entities, in which packets destined for one end of the tunnel and received at the other end are encapsulated inside a new network packet and then sent to the other end through the network. The receiving end will de-encapsulate the received packet and process the original packet previously received at the other end. Once the destination virtual router VR2 starts receiving IP traffic via the regular network route (i.e., outside the tunnel), VR2 informs source router VR1 to stop advertising the VM subnet and shut down after a certain amount of time. It should be noted that there may be a period where both source and destination are advertising routes to the same IP subnet. This does not represent a problem because there can be more than one route to a certain subnet at any router, and because physical routers will pick the route based on cost. To help physical routers make the right choice, the source router may advertise the VM subnet at a larger cost after control is transferred to the destination VM'.

The tunnel can be brought down right after VR2 starts receiving packets or after a while using heuristics to determine how long the tunnel should be kept. For example, the tunnel can be brought down after a predetermined amount of time (e.g. 30 seconds), or after a timeout for not observing any more packets, or through active probing of the routing infrastructure, or after the time between packets in the tunnel exceeds a certain threshold value, or using a rating measure that combines the aforementioned conditions, etc.

In the configuration shown in FIG. 3, the VM network 10.0.0.0/30 occupies 4 IP addresses, one for the VM, one for the virtual router, and the other two are the network address (10.0.0.0) and the broadcast address (10.0.0.3), as defined by the IP protocol. When deploying a large number of VM's, this use of IP addresses wastes IP address space.

Figure 4:
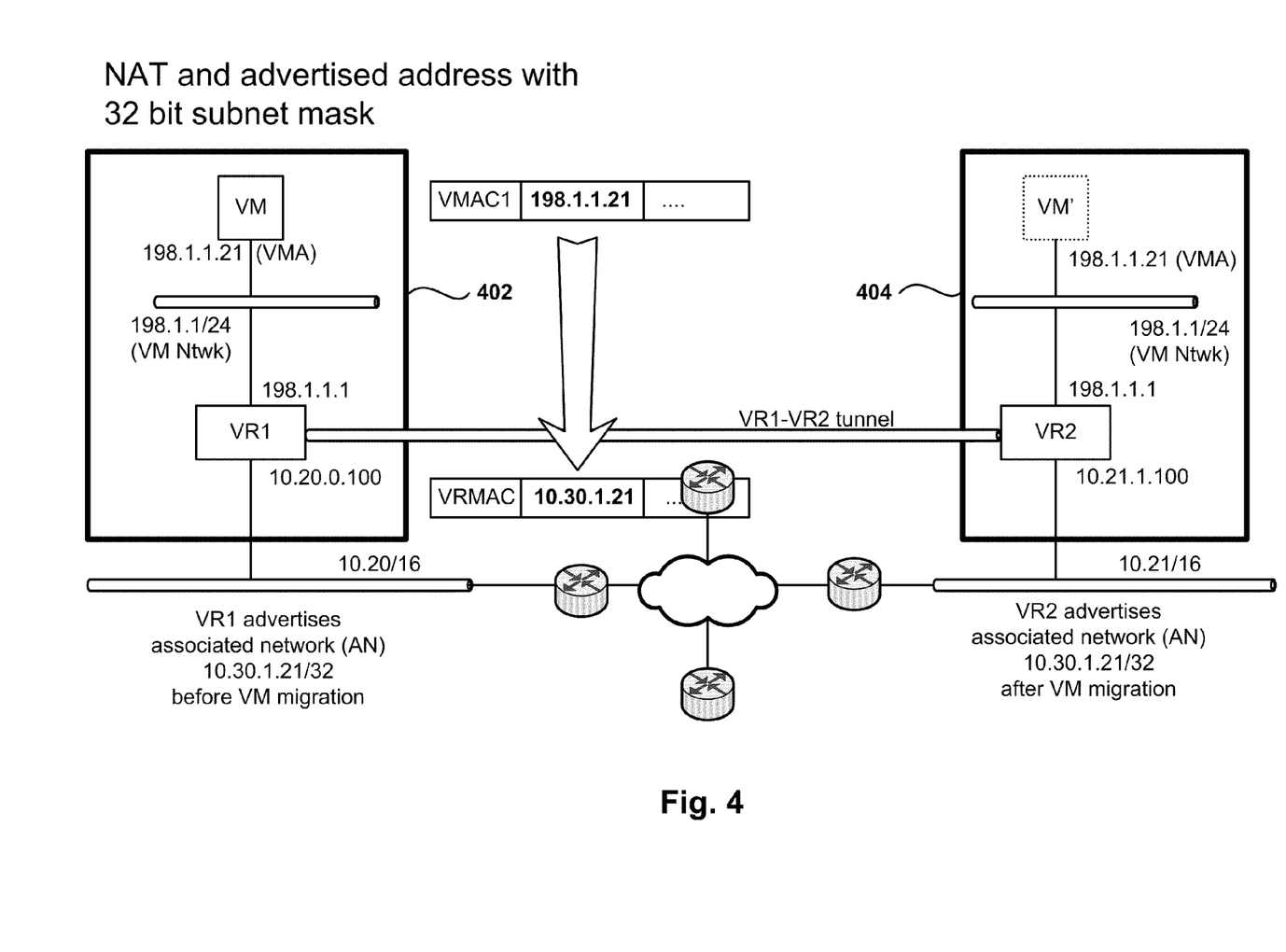
FIG. 4 depicts a network environment for implementing Network Address Translation in virtual routers, according to one embodiment.

FIG. 4 depicts a network environment for implementing Network Address Translation (NAT) in virtual routers, according to one embodiment. NAT is a process of modifying network address information in datagram packet headers while in transit across a traffic routing device to remap a given address space into another. NAT functionality is implemented in the virtual router to better utilize IP address space. In the example shown in FIG. 4, the VM is in VM network 198.1.1/24 and is configured to a private IP address of 198.1.1.21. The VM always forwards traffic to VR1 at 198.1.1.1. On the other interface of VR1, there is subnet 10.20/16 (first network) where VR1 has an IP address of 10.20.0.100.

VR1 does not advertise subnet 198.1.1/24. Instead, VR1 advertises a subnet with a single IP address 10.30.1.21/32. The complete 32 bits of the IP address form the network address, and no space is reserved for a node portion of the IP address. Therefore, the VM is associated exclusively with fictitious network address 10.30.1.21/32 (associated network). The association is exclusive because no other entity is associated with network address 10.30.1.21/32. Additionally, the network address is referred to as fictitious because no entity uses this address as an IP address in its network configuration. However, it is a real valid IP address within the networking environment used to route packets to their destination. It should be noted that an IP address with a subnet mask of 32 bits, i.e., where the whole address space is reserved for the network portion of the IP address, may not be accepted by some routers because of the lack of a node part in the IP address. Additionally, propagating network addresses associated with a single node may result in very large routing tables in routers, which may cause bottlenecks or saturation of the routing table space. Thus, this type of routing with subnet masks of /32 is better suited for internal routers within an organization because a single organization has control of the routers and the number of nodes and networks within the organization's network, but open configurations are also possible.

As IP traffic for the VM goes through VR1, all packets are examined by VR1. For traffic going to the VM, VR1 translates the destination IP address from 10.30.1.21 to 198.1.1.21, and for traffic going out to the network, VR1 translates the source IP address from 198.1.1.21 to 10.30.1.21. To the outside world, the VM is located at 10.30.1.21. If VR1 were providing mere NAT functionality, the IP address shown to the world would typically be the IP address of VR1 within the outside network, that is, 10.20.0.100. However, because VR1 is a router instead of a plain end-node to the outside world, VR1 can use the IP address of the network associated with VM, 10.30.1.21.

When the VM migrates to destination host 404 as VM', the subnet environment for VM is replicated by virtual router 2 (VR2), and then VR2 starts advertising the network address 10.30.1.21/32 to other routers in the network, as previously discussed in reference to FIG. 3.

Figure 5:
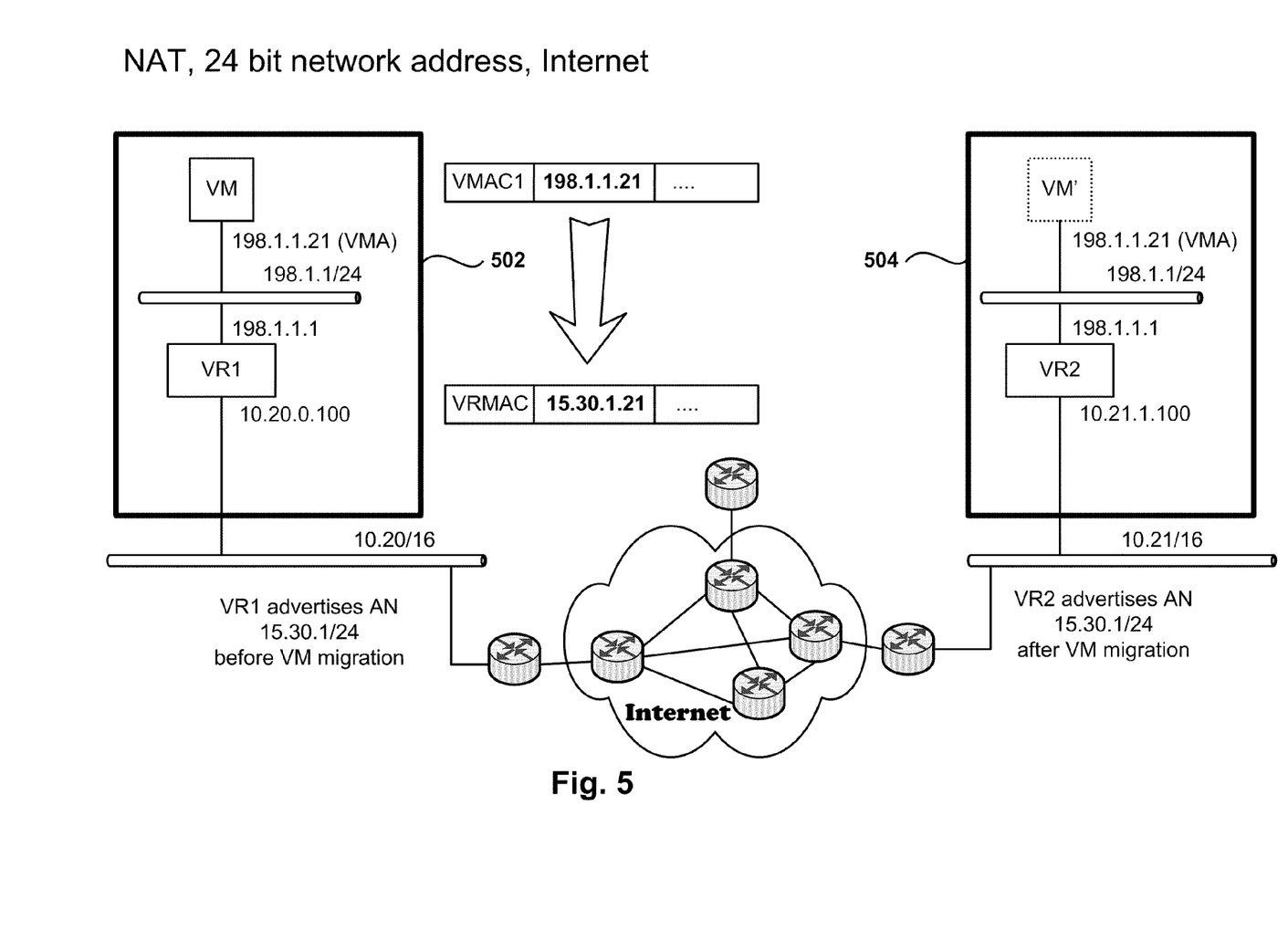
FIG. 5 illustrates migrating a VM to a different network through the Internet, according to one embodiment.

FIG. 5 illustrates migrating a VM to a different network through the Internet, according to one embodiment. In the network diagram of FIG. 5, a network address with a subnet mask of 24 bits is associated with the VM. Although the number of network addresses available is smaller when using a 24-bit instead of a 32-bit mask, routers in the network will much more likely accept addresses with 24 bits, including routers external to the IT management organization, such as the ones on the Internet infrastructure located at the edge of the private IT network.

The IP address scheme of FIG. 5 is the same as the scheme in FIG. 4, except that the address of a network associated with the VM is 15.30.1/24. Since the network 15.30.1/24 is exclusively associated with the VM, any address in that network can be used by VR1 to include in IP headers, such as 15.30.1.21 shown in FIG. 5.

It should be noted that embodiments of the invention are compatible with existing Internet Routing Protocols, such as RIP, EIGRP, BGP, etc. Additionally, for VM's with multiple virtual network adapters, the described embodiments can be expanded by using multiple virtual routers for one VM, one virtual router for each virtual adapter. If the VM migration causes traffic to flow through the Internet, or any other network outside the control of the entity managing the VM, encryption can be used to protect VM communications.

In the case that a VM provides service over multiple IP addresses on a single network adapter, the virtual router is configured to map between pairs of public and private IP addresses. In one embodiment, the virtual router provides support for DHCP services on the VM subnet, allowing the VM to have a generic network configuration. The virtual router assigns the IP address 198.1.1.21 to the VM using the DHCP protocol. The data center management software assigns the public IP address for the VM. This eases considerably the burden of deploying new services.

Figure 6:
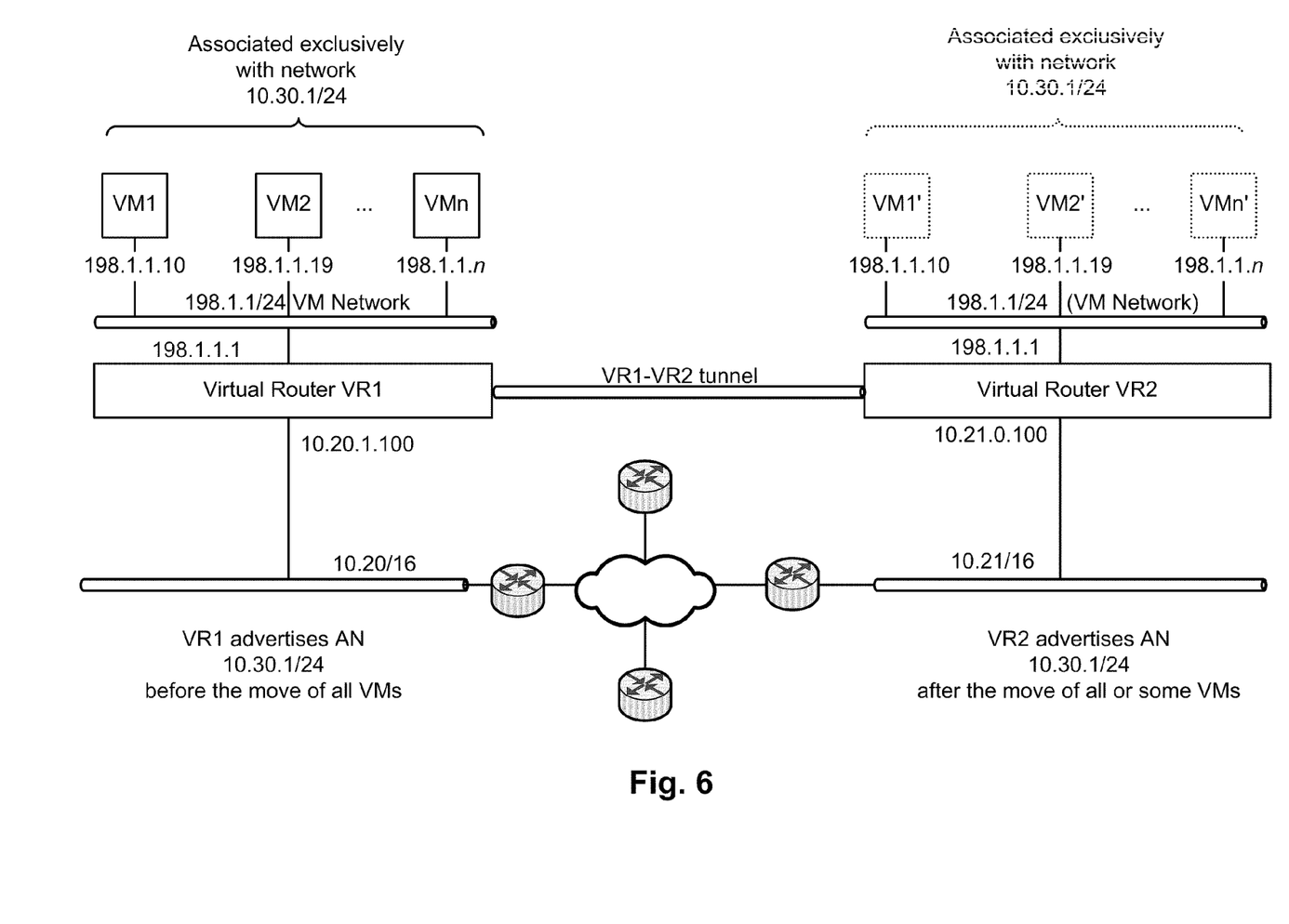
FIG. 6 illustrates an embodiment for migrating multiple virtual machines to a different host in accordance with one embodiment of the invention.

FIG. 6 illustrates an embodiment for migrating multiple VMs to a different host in accordance with one embodiment of the invention. The VMs move as a group from one host to the other. Migrating as a group does not mean that they move simultaneously, but rather, that decisions on whether to move the VMs are made as a group instead of as a single VM. One address of a network is associated exclusively with the group of VMs that includes VM1, VM2, ... VMn. Because VMs 1-$n$ share the address of the network, the VMs have to move as a group. This can be useful in several scenarios, such as planned site downtime or disaster avoidance where all the VMs are transferred to another location because the host is going to be shut down.

As some VMs start migrating, there can be a time when some VMs still run in the original host while other VMs run in the destination host. During this time, the tunnel VR1-VR2 is used to exchange traffic between the virtual routers to forward packets destined for a particular VM that arrive at a virtual router different from the virtual router connected to the particular VM. Once all the VMs have transferred to a different host and the conditions for closing the tunnel have been met, then the tunnel and the original virtual router VR1 will be terminated.

During operation, VR1 advertises a route for network address 10.30.1/24. It should be noted that a 24 bit mask is exemplary, but other bit masks can be used. For example, a 32 bit subnet mask can be exclusively assigned to the group of VMs 1-$n$. Internally, the VMs sit in subnet 198.1.1/24. Once it is determined that the group is being moved, the system starts transferring VMs to the destination site. The original internal subnet 198.1.1/24 is replicated by VR2 on the destination site. As VMs complete their migration, traffic for the transferred VMs will flow through tunnel VR1-VR2. In one embodiment, VR2 will start advertising the new route to 10.30.1/24 once all the VMs have been moved. In another embodiment, VR2 starts advertising the new route to 10.30.1/24 when the system determines that there would be less traffic in the tunnel if VR2 takes over responsibility over the advertised network. In yet another embodiment, VR2 starts advertising the new route for the network once more VMs from the group are running on the destination host than on the source host.

Since VR1 and VR2 now support more than one VM, the virtual routers have to determine how to distribute the IP traffic across the VMs. In one embodiment, the mapping of IP addresses is performed with a similar algorithm to the one performed in NAT, using port numbers and tracking connection status. In another embodiment where there are enough nodal addresses in the associated network, each VM is mapped by the virtual router to one address from the associated network. It should be noted that even though one address is assigned to each VM, the address is still fictitious in the sense that the VM is not aware of this address. Only the virtual router is aware of this address mapping for each particular VM.

In one embodiment, the requirement that VMs VM1-$n$ reside in a single host can be eliminated if it is decided that a single VM or a subset of the VMs needs to be moved to another host permanently without having to support the tunnel between virtual routers. The network address associated with the VMs as a group is then broken down into a finer granularity so different virtual routers at source and destination can manage the address corresponding to all the VMs. For example, in the scenario shown in FIG. 6, it is decided to move VM2 to a different host permanently while keeping other VMs at the source. In this case virtual router will change from advertising 10.30.1/24 to advertising networks with more bits in the subnet mask. If the new chosen subnet mask includes 32 bits, VR1 will start advertising networks 10.30.1.1/32, 10.30.1.2/32, 10.30.1.n/32, etc. Clearly, n has to be smaller than 254 for this particular example to work. After VM2 moves to the new host, the new virtual router will start advertising 10.30.1.2/32, as previously described with reference to FIG. 3.

Figure 7:
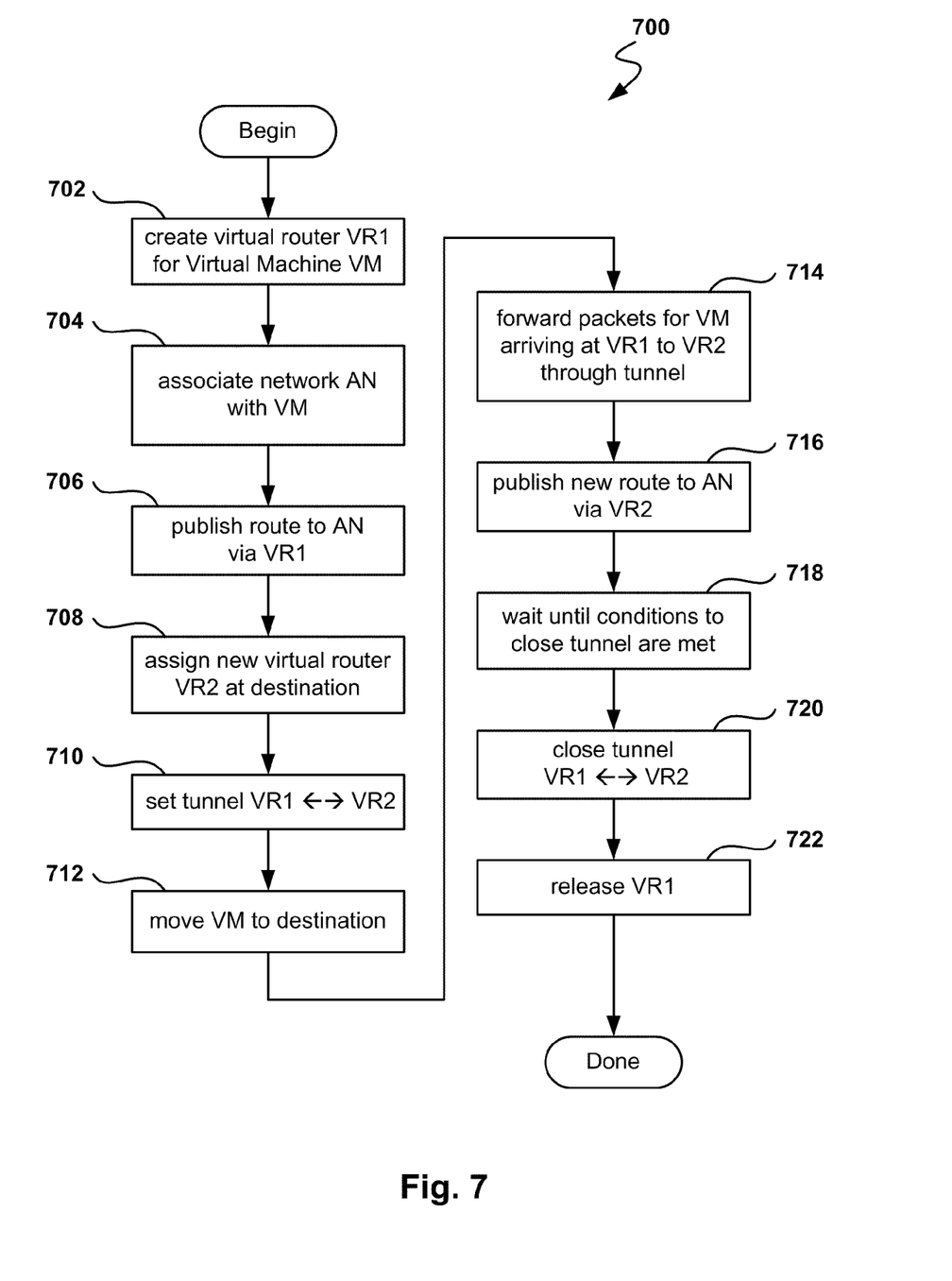
FIG. 7 shows process flow for migrating a VM to a different host in a different network, according to one embodiment of the invention.

FIG. 7 shows process flow for migrating a VM to a different host in a different network, according to one embodiment of the invention. In operation 702, a virtual router VR1 at the origin host is created for the VM, and in operation 704 the address AN of a network is associated exclusively with the VM. The route for AN is published, or propagated throughout the network, via virtual router VR1 in operation 706. A second virtual router VR2 associated with the VM is created in the destination host in operation 708.

In operation 710, a tunnel VR1-VR2 is created between the virtual routers. The VM is moved to the destination host in operation 712 and packets arriving at VR1 destined for VM are forwarded through the tunnel to VR2 in operation 714. VR2 publishes a new route to AN via VR2 in operation 716. During a period of time there is a wait in operation 718 until conditions to close the tunnel are met. Once the conditions are met, the tunnel is closed in operation 720 and the original virtual router VR1 is released from its duties, that is, VR1 is terminated. Thus, this solution does not require setting up a permanent tunnel between the source and the destination hosts. If the original host is shutdown in solutions deploying a permanent tunnel, then the transferred VM is left disconnected from the network because all the packets to or from the VM must go through the original host, and the original host is not there anymore to forward those packets. The current solution allows the original host to be shut down without disconnecting from the network the VM that was transferred. At this point the move for the VM is complete and the original host can free all resources reserved for the VM.

It should be noted that the described operations with reference to FIG. 7 can be performed in different order. For example, operation 716 to publish the new route for the VM can be performed before the VM is moved in operation 712 because the tunnel is already set.

Figure 8:
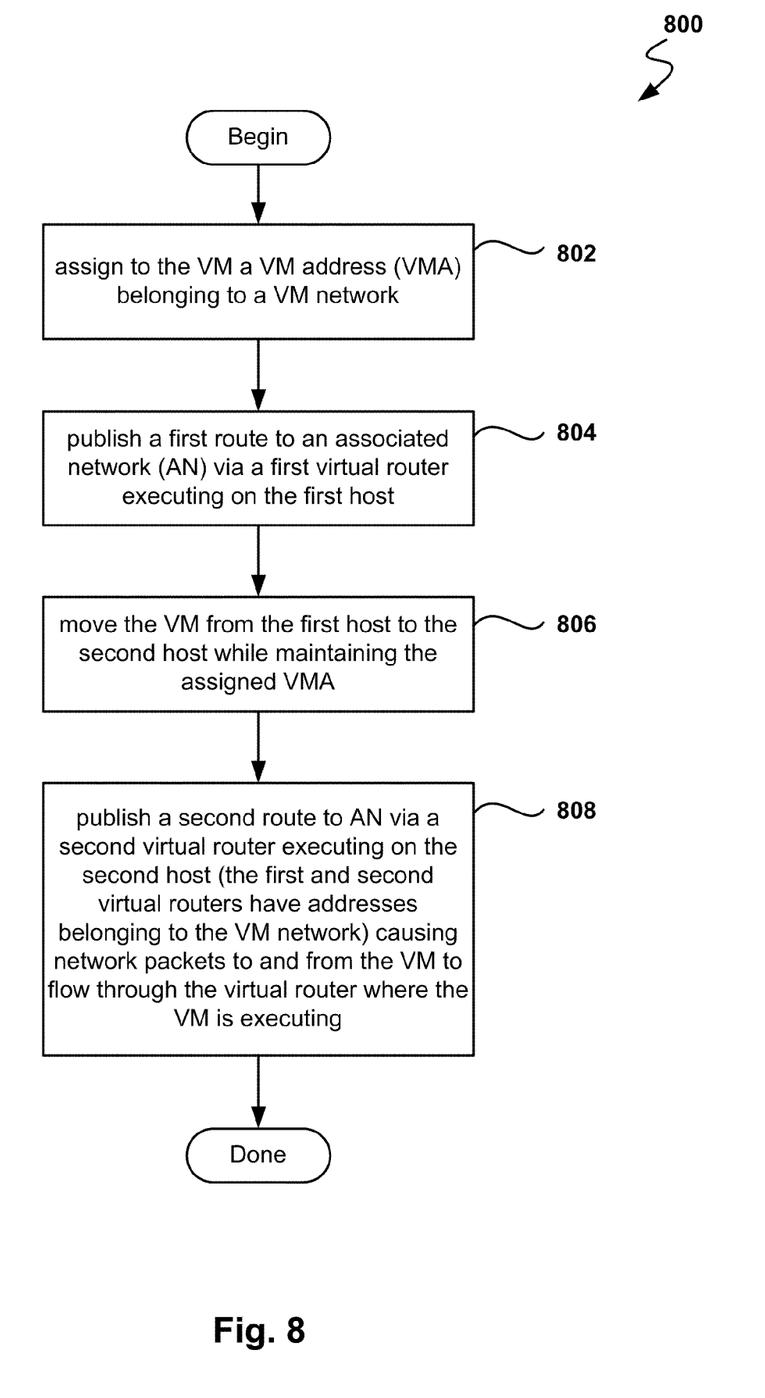
FIG. 8 shows process flow for migrating a virtual machine (VM) executing on a first host on a first network to a second host on a second network different from the first network, according to one embodiment of the invention.

FIG. 8 shows process flow for migrating a VM executing on a first host on a first network to a second host on a second network different from the first network, according to one embodiment of the invention. In operation 802, a VM address (VMA) belonging to a VM network is assigned to the VM. A first route to an associated network (AN) via a first virtual router executing on the first host is published in operation 804. In operation 806, the VM is moved from the first host to the second host, while the VM maintains the assigned VMA.

In operation 808, a second route to AN via a second virtual router executing on the second host is published. The first and second virtual routers have addresses belonging to the VM network, and network packets to and from the VM flow through the virtual router where the VM is executing.

Figure 9:
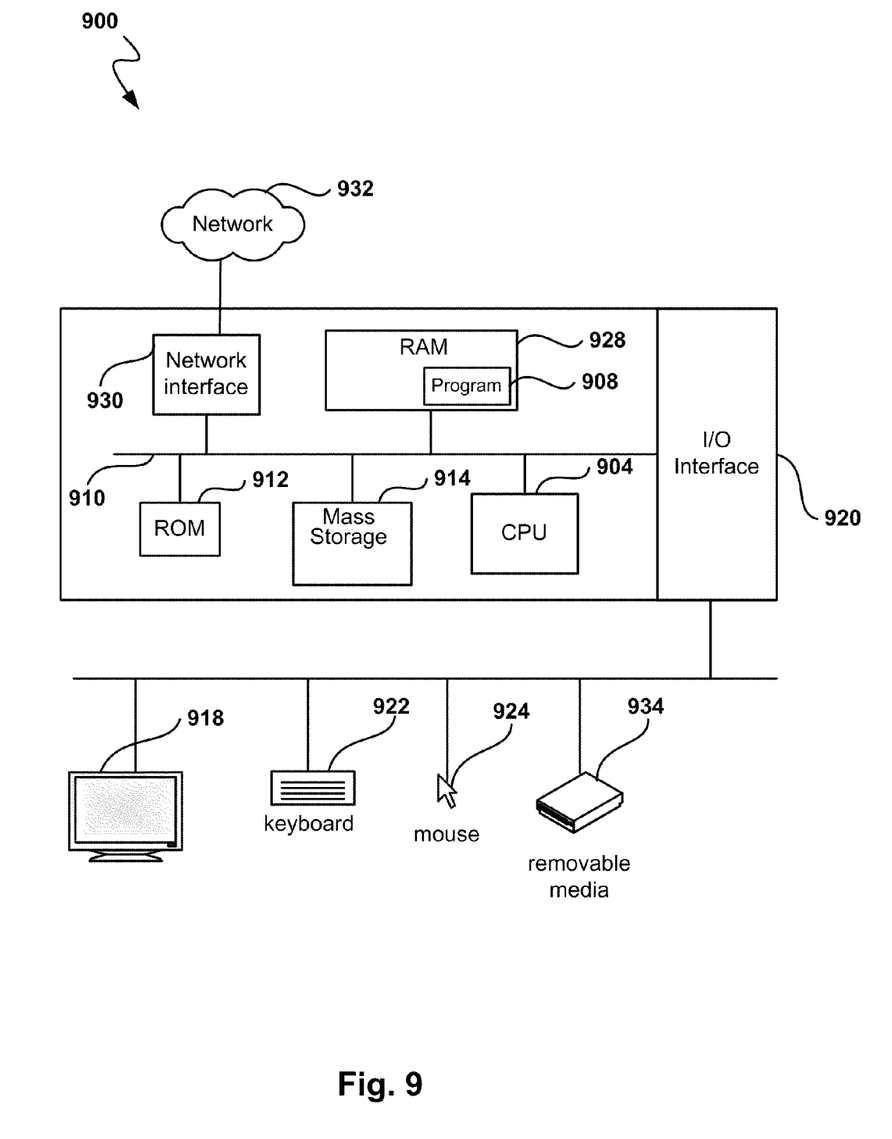
FIG. 9 is a simplified schematic diagram of a computer system according to one embodiment.

FIG. 9 is a simplified schematic diagram of a computer system according to one embodiment. It should be appreciated that embodiments of the invention described herein may be performed with a digital processing system, such as a conventional, general-purpose computer system. Special purpose computers, which are designed or programmed to perform only one function may be used in the alternative. As shown in FIG. 9, the computer system includes a central processing unit (CPU) 904, which is coupled through bus 910 to random access memory (RAM) 906, read-only memory (ROM) 912, and mass storage device 914. Program 908 resides in random access memory (RAM) 906, but can also reside in mass storage 914. Program 908 can include a virtual machine, a virtual router, and other programs used to implement embodiments of the invention. Mass storage device 914 represents a persistent data storage device such as a floppy disc drive or a fixed disc drive, which may be local or remote. Network interface 930 provides connections via network 932, allowing communications with other devices. It should be appreciated that CPU 904 may be embodied in a general-purpose processor, a special purpose processor, or a specially programmed logic device. Input/Output (I/O) interface provides communication with different peripherals and is connected with CPU 904, RAM 906, ROM 912, and mass storage device 914, through bus 910. Sample peripherals include display 918, keyboard 922, cursor control 924, removable media device 934, etc.

Display 918 is configured to display the user interfaces described herein. Keyboard 922, cursor control 924, removable media device 934, and other peripherals are coupled to I/O interface 920 in order to communicate information in command selections to CPU 904. It should be appreciated that data to and from external devices may be communicated through I/O interface 920.

Embodiments of the invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. The machines can also be virtualized to provide physical access to storage and processing power to one or more users, servers, or clients. Thus, the virtualized system should be considered a machine that can operate as one or more general purpose machines or be configured as a special purpose machine. Each machine, or virtual representation of a machine, can transform data from one state or thing to another, and can also process data, save data to storage, display the result, or communicate the result to another machine.

One or more embodiments of the present invention can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although embodiments have been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for migrating a virtual machine (VM) executing on a first host on a first network to a second host on a second network different from the first network, the method comprising:

assigning to the VM a VM address (VMA) belonging to a VM network;

publishing a first route to an associated network (AN) via a first virtual router executing on the first host when the VM is executing on the first host on the first network, wherein the AN is linked to the VM;

migrating the VM from the first host to the second host, the VM maintaining the assigned VMA after migrating; and publishing a second route to the AN via a second virtual router executing on the second host after the start of the migrating of the VM to the second host, the first and second virtual routers having addresses belonging to the VM network, wherein the AN is still linked to the VM after migrating to the second host and wherein network packets to and from the VM flow through the virtual router where the VM is executing, wherein the publishing the first and second routes comprises propagating the first and second routes via the first and second virtual routers.

2. The method of claim 1, wherein the first network, the second network, the AN, and the VM network have four different network addresses, wherein outbound packets originating at the VM flow to the virtual router on the host where the VM is executing, the outbound packets having VMA as a source address, the first and the second virtual router replace the outbound packets source addresses with a VM outside address before forwarding the outbound packets, the VM outside address belonging to the AN.

3. The method of claim 2, wherein the first and second virtual routers provide Network Address Translation (NAT) services, wherein inbound packets with a destination address equal to the VM outside address and arriving at the virtual router where the VM is executing are forwarded to the VM after replacing the destination address with VMA.

4. The method of claim 2, wherein assigning VMA further includes, providing Dynamic Host Configuration Protocol (DHCP) support on the VM network by the first virtual router; and assigning the VMA to the VM with the DHCP protocol.

5. The method of claim 1, wherein the AN has associated an internet protocol (IP) subnet mask of 255.255.255.255 (/32).

6. The method of claim 1, wherein a cost used when publishing the second route is lower than a cost used when publishing the first route.

7. The method of claim 1, wherein migrating the VM further includes,
creating a network tunnel between the first and the second virtual routers, wherein packets destined to the VM and received at the virtual router on the host where the VM is not executing are forwarded through the network tunnel.

8. The method of claim 7, further including,
terminating the network tunnel after conditions for terminating the tunnel are met, wherein one or more conditions are selected from the group consisting of a timeout is reached, a time between packets in the tunnel exceeds a certain value, a timeout for not observing any more packets, and active probing of the routing infrastructure.

9. The method of claim 8, further including,
terminating the first virtual router after terminating the network tunnel.

10. The method of claim 1, further including,
creating a group of VMs executing on the first host, the VM belonging to the group of VMs, wherein each VM in the group of VMs has an address belonging to the VM network; and
creating a network tunnel between the first and the second virtual routers, wherein packets destined to a particular VM from the group and received at the virtual router on the host where the particular VM is not executing are forwarded through the network tunnel.

11. The method of claim 10, further including,
migrating each VM in the group from the first host to the second host; and
terminating the network tunnel after all the VMs have moved and when the network tunnel is not needed for the group of VMs to maintain network connectivity.

12. The method of claim 10, further including,
fragmenting the AN into a plurality of networks,
assigning to each VM in the group a different network from the plurality of networks,
publishing routes to the plurality of networks via the first router except for the network assigned to the VM that moved to the second host,
publishing a route to the network assigned to the VM that moved to the second host via the second router, and
terminating the network tunnel when the network tunnel is not needed to maintain network connectivity for the VM that moved to the second host.

13. The method of claim 1, wherein the AN is the same as the VM network.

14. A system having computers for migrating a virtual machine from a first computer on a first network to a second computer on a second network, the system comprising:
a first virtual router executing in the first computer; and
a second virtual router created in the second computer after determining that the VM is migrating to the second computer;
wherein the first and second virtual routers publish an address of an associated network (AN) that is linked to the VM by propagating the address of the AN via the first and second virtual routers to allow the VM to have a same network address while executing on the first and on the second computer;
wherein the first network, the second network, and the AN have different network addresses; and
wherein the first and second virtual routers provide Network Address Translation (NAT) services to assign the network address used by the VM; and
wherein network packets to and from the VM flow through the first or second virtual router where the VM is executing.

15. The system of claim 14, wherein the network address used by the VM is not part of the first network, nor the second network, nor the AN.

16. The system of claim 14, wherein the published address of the AN occupies the whole space reserved for a network address, wherein the published address of the AN leaves no room for a node address in the AN.

17. The system of claim 16, wherein the networking layer protocol is Internet Protocol (IP) address version 4, wherein the first and second virtual routers publish the AN with a subnet mask of 255.255.255.255.

18. A computer program embedded in a non-transitory computer-readable storage medium, when executed by one or more processors, for migrating a virtual machine (VM) executing on a first host on a first network to a second host on a second network, the computer program comprising:
program instructions for assigning to the VM a VM address (VMA) belonging to a VM network when the VM is executing on the first host on the first network, wherein the AN is linked to the VM;
program instructions for publishing a first route to an associated network (AN) via a first virtual router executing on the first host, the first network, the second network, the associated network AN, and the VM network having four different network addresses;
program instructions for migrating the VM from the first host to the second host, the VM maintaining the VMA after the migrating; and
program instructions for publishing a second route to the AN via a second virtual router executing on the second host after the start of the migrating of the VM to the second host, the first and second virtual routers having addresses belonging to the VM network, wherein the AN is still linked to the VM after migration to the second host and wherein network packets to and from the VM flow through the virtual router where the VM is executing, wherein the publishing the first and second routes comprises propagating the first and second routes via the first and second virtual routers.

19. The method of claim 10, wherein the method further includes migrating the group of VMs from the first host to the second host, and wherein the propagating the second route to the AN includes propagating the second route to the AN via the second virtual router once more VMs from the group of VMs are running on the second host than on the first host.

* * * * *